United States Patent
Duff

(10) Patent No.: US 10,300,946 B2
(45) Date of Patent: May 28, 2019

(54) APPARATUS AND METHOD FOR ADJUSTING A JOINT OF A CONNECTING ROD

(71) Applicant: Honda Motor Co., Ltd., Tokyo (JP)

(72) Inventor: Douglas J. Duff, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 255 days.

(21) Appl. No.: 15/185,656

(22) Filed: Jun. 17, 2016

(65) Prior Publication Data
US 2017/0361874 A1 Dec. 21, 2017

(51) Int. Cl.
*B23Q 1/00* (2006.01)
*B62D 17/00* (2006.01)

(52) U.S. Cl.
CPC ...... *B62D 17/00* (2013.01); *B60G 2206/1112* (2013.01)

(58) Field of Classification Search
CPC ........... B23Q 3/00; B23Q 3/186; B23P 11/00; B25B 3/00; B25B 5/00
See application file for complete search history.

(56) References Cited

U.S. PATENT DOCUMENTS

| | | | |
|---|---|---|---|
| 3,878,739 A | 4/1975 | Crandell | |
| 4,691,907 A * | 9/1987 | Yang | B25B 5/003 269/152 |
| 5,199,333 A | 4/1993 | Snyder, Jr. | |
| 5,213,435 A | 5/1993 | Broszat | |
| 5,438,741 A | 8/1995 | Ni | |
| 5,533,580 A | 7/1996 | Reaves | |
| 7,278,340 B2 | 10/2007 | Furnish | |
| 7,357,053 B2 | 4/2008 | Doan | |
| 7,377,403 B2 * | 5/2008 | Gorrie | B65D 35/28 222/103 |
| 8,015,901 B2 | 9/2011 | Kanazawa et al. | |
| 2003/0068207 A1 * | 4/2003 | Sarh | B23B 47/28 408/1 R |
| 2006/0108729 A1 * | 5/2006 | Siegel | B25B 1/08 269/266 |
| 2012/0175832 A1 | 7/2012 | Hacker et al. | |
| 2013/0298374 A1 | 11/2013 | Lucas | |
| 2014/0001691 A1 * | 1/2014 | Royal | B25B 5/003 269/45 |
| 2016/0243675 A1 * | 8/2016 | Botten | B25B 5/102 |

* cited by examiner

*Primary Examiner* — Lee D Wilson
(74) *Attorney, Agent, or Firm* — Armstrong Teasdale LLP

(57) ABSTRACT

An apparatus for adjusting a joint of a connecting rod is provided. The joint couples a first segment of the rod to a second segment of the rod. The apparatus includes a body and a first leg having a first distal end for engaging the first rod segment to inhibit rotational movement of the first rod segment while permitting axial movement of the first rod segment relative to the first leg. The apparatus also includes a second leg for engaging the second rod segment. The second leg has a second distal end for inhibiting rotational movement of the second rod segment relative to the second leg. The apparatus further includes a clamp for selectively inhibiting axial movement of the second rod segment relative to the second leg.

16 Claims, 2 Drawing Sheets

APPARATUS AND METHOD FOR ADJUSTING A JOINT OF A CONNECTING ROD

BACKGROUND

The present disclosure relates generally to rods and, more particularly, to an apparatus and a method for adjusting a joint of a connecting rod.

At least some known vehicles include a plurality of wheel assemblies coupled to a suspension system. The suspension system includes at least one connecting rod (e.g., a tie rod or a toe link) that helps to maintain a desired alignment of each respective wheel assembly during operation of the vehicle.

At least some of such rods include a pair of segments that are coupled together at a joint that is selectively adjustable. For example, some of such joints are manually adjustable using a wrench. By adjusting the joint, the length of the rod, and/or the orientation of a rod segment relative to the respective wheel assembly, can be selectively changed, which in turn changes the alignment of the wheel assembly. However, manually adjusting known joints may be difficult, and may require more than one person in order to be done properly. For example, during some adjustments, a first person may be necessary to hold at least one of the rod segments, while a second person adjusts the joint to lock the rod at a desired length and to lock the rod segment(s) at a desired orientation. As can be appreciated, such adjustments can be time consuming and laborious.

BRIEF SUMMARY

In one aspect, an apparatus for adjusting a joint of a connecting rod is provided. The joint couples a first segment of the rod to a second segment of the rod. The apparatus includes a body and a first leg having a first distal end for engaging the first rod segment to inhibit rotational movement of the first rod segment while permitting axial movement of the first rod segment relative to the first leg. The apparatus also includes a second leg for engaging the second rod segment. The second leg has a second distal end for inhibiting rotational movement of the second rod segment relative to the second leg. The apparatus further includes a clamp for selectively inhibiting axial movement of the second rod segment relative to the second leg.

In another aspect, a method for adjusting a joint of a connecting rod is provided. The joint couples a first segment of the rod to a second segment of the rod. The method includes grasping a handle of an apparatus including a body, a first leg, and a second leg. The first leg has a first distal end, and the second leg has a second distal end and a clamp. The method also includes engaging the first rod segment with the first distal end of the first leg such that the first leg inhibits rotational movement of the first rod segment while permitting axial movement of the first rod segment relative to the first leg. The method further includes engaging the second rod segment with the second distal end of the second leg such that the second leg inhibits rotational movement of the second rod segment relative to the second leg. The method further includes actuating a clamp that inhibits axial movement of the second rod segment relative to the second leg.

In yet another aspect, a method of assembling an apparatus for adjusting a joint of a connecting rod is provided. The joint couples a first segment of the rod to a second segment of the rod. The method includes forming a body and forming a first leg with a first distal end for engaging the first rod segment to inhibit rotational movement of the first rod segment while permitting axial movement of the first rod segment relative to the first leg. The method also includes forming a second leg with a second distal end for engaging the second rod segment to inhibit rotational movement of the second rod segment relative to the second leg. The method further includes fabricating a clamp of the apparatus such that the clamp is selectively actuated for inhibiting axial movement of the second rod segment relative to the second leg.

The features, functions, and advantages described herein may be achieved independently in various embodiments of the present disclosure or may be combined in yet other embodiments, further details of which may be seen with reference to the following description and drawings.

BRIEF DESCRIPTION

Although specific features of various embodiments may be shown in some drawings and not in others, this is for convenience only. Any feature of any drawing may be referenced and/or claimed in combination with any feature of any other drawing.

DETAILED DESCRIPTION

The present disclosure relates generally to an apparatus and a method for adjusting a joint of a connecting rod (e.g., a tie rod or a toe link of an automobile suspension system). The exemplary apparatus is a handheld device that enables a single user to selectively adjust a rod joint without requiring the assistance of a second person. More specifically, the exemplary apparatus enables a single person to simultaneously engage a plurality of rod segments to maintain a desired alignment of the rod segments relative to one another, while also adjusting a joint between the rod segments to increase/decrease the spacing between the rod segments for selectively lengthening/shortening the rod as desired. Additionally, the exemplary apparatus facilitates locking the rod segments at a desired spacing relative to one another, while maintaining an angular orientation of at least one of the rod segments relative to the other. Moreover, because the exemplary apparatus is substantially symmetrical from side-to-side, a user may be positioned on either side of the apparatus when using the apparatus (e.g., the same apparatus can be used to adjust a driver side tie rod and a passenger side tie rod). As such, the apparatus facilitates reducing the time, manpower, and effort necessary to adjust a connecting rod joint, particularly when adjusting a rod joint of an automobile suspension system during an alignment procedure.

As used herein, an element or step recited in the singular and preceded with the word "a" or "an" should be understood as not excluding plural elements or steps unless such exclusion is explicitly recited. Moreover, references to "one embodiment" and/or the "exemplary embodiment" are not intended to be interpreted as excluding the existence of additional embodiments that also incorporate the recited features.

Figure 1:
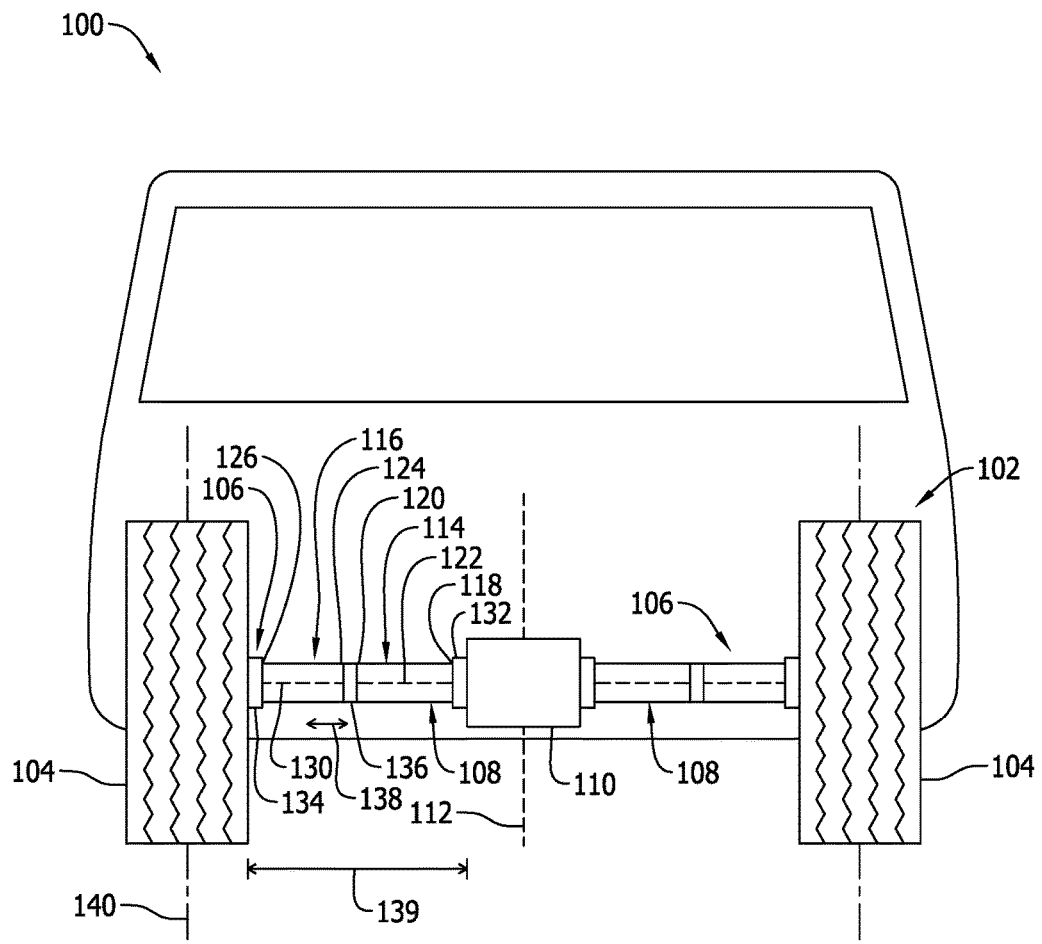
FIG. 1 is a schematic illustration of an exemplary vehicle.

FIG. 1 illustrates an exemplary vehicle 100 (e.g., an automobile). In the exemplary embodiment, vehicle 100 includes a drive system 102 including a plurality of wheel assemblies 104, and a suspension system 106 coupled to each wheel assembly 104. Each suspension system 106 includes a connecting rod 108 (e.g. a tie rod, a toe link, etc.) coupled between a respective wheel assembly 104 and a base 110 to facilitate properly orienting the wheel assembly 104 relative to a central plane 112 extending through vehicle 100. In one embodiment, wheel assemblies 104 are rear wheel assemblies, and base 110 is a rear subframe of vehicle 100. In another embodiment, wheel assemblies 104 are front wheel assemblies, and base 110 is a gear of a steering system (not shown) of vehicle 100 (e.g., a rack gear of a rack-and-pinion assembly of the steering system). Notably, drive system 102 may include any suitable number of wheel assemblies 104 arranged in any suitable manner. For example, drive system 102 may include two or more wheel assemblies 104, as shown in the exemplary embodiment, or drive system 102 may include only one wheel assembly 104 in other embodiments.

In the exemplary embodiment, each rod 108 includes a first rod segment 114 and a second rod segment 116. Second rod segment 116 is positioned closer to its respective wheel assembly 104 than first rod segment 114, and first rod segment 114 is thus positioned closer to base 110 than second rod segment 116. First rod segment 114 has a first end 118, a second end 120, and a centerline axis 122 extending between first and second ends 118 and 120, respectively. Similarly, second rod segment 116 has a first end 124, a second end 126, and a centerline axis 130 extending between first and second ends 124 and 126, respectively. In other embodiments, first rod segment 114 and/or second rod segment 116 may be positioned in any suitable manner that enables rod 108 to be selectively adjusted as described herein.

In the exemplary embodiment, first rod segment first end 118 is coupled to base 110 via a first coupling 132, second rod segment second end 126 is coupled to the respective wheel assembly 104 via a second coupling 134, and first rod segment second end 120 is coupled to second rod segment first end 124 via a joint 136. Any suitable number of suspension components (not shown) may be coupled between first coupling 132 and base 110, and/or between second coupling 134 and its wheel assembly 104. For example, in some embodiments, first coupling 132 may be coupled directly to base 110, such that no suspension components are coupled between first coupling 132 and base 110, and/or second coupling 134 may be coupled directly to wheel assembly 104, such that no suspension components are coupled between second coupling 134 and wheel assembly 104.

In the exemplary embodiment, first coupling 132 enables unidirectional movement of first rod segment 114 relative to base 110, and second coupling 134 enables multi-directional movement of second rod segment 116 relative to wheel assembly 104. For example, first coupling 132 may be a hinge-type coupling that permits only longitudinal (i.e., up-and-down) movement of first rod segment 114 relative to base 110, while inhibiting lateral (i.e., side-to-side) movement of first rod segment 114 relative to base 110, such that first rod segment 114 is not rotatable about axis 122 at first coupling 132. Moreover, second coupling 134 may be a ball-and-socket-type coupling that permits longitudinal movement and lateral movement (e.g., omni-directional movement) of second rod segment 116 relative to wheel assembly 104, such that second rod segment 116 is rotatable about axis 130 at second coupling 134. In other embodiments, first coupling 132 and/or second coupling 134 may be any suitable type of coupling that permits (or constrains) movement of first rod segment 114 and second rod segment 116, respectively, in any suitable manner that facilitates adjusting rod 108 as set forth herein.

To facilitate maintaining proper alignment of wheel assembly 104 relative to base 110 during operation of vehicle 100, the length and orientation of rod 108 between base 110 and wheel assembly 104 is selectively adjustable. More specifically, joint 136 is adjustable to selectively protract/retract second rod segment 116 relative to first rod segment 114 along a lengthwise dimension 138 of rod 108. Such adjustments increase/decrease the overall length 139 of rod 108 to facilitate wheel alignment. For example, the overall length 139 of rod 108 may be adjusted such that a central plane 140 of wheel assembly 104 is aligned with central plane 112 of vehicle 100, or that an angle between central plane 140 of wheel assembly 104 and central plane 112 of vehicle 100 is a predefined angle. However, if second rod segment 116 is not set at a predefined angular orientation about axis 130 at second coupling 134 (e.g., within a predefined range of angular orientations), second coupling 134 may end up being improperly positioned, which can result in damage to suspension system 106 (and other vehicle components) during operation of vehicle 100, and can diminish the overall handling capability of vehicle 100.

Figure 2:
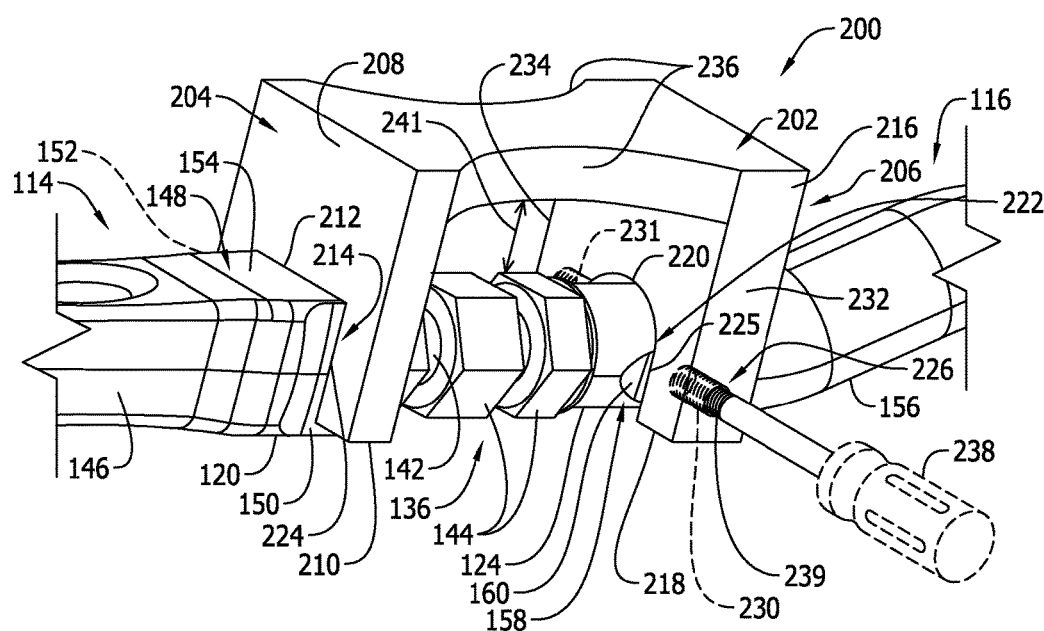
FIG. 2 is a perspective view of an exemplary apparatus for use in adjusting a connecting rod joint of the vehicle shown in FIG. 1.

FIG. 2 illustrates an exemplary apparatus 200 for use in adjusting rod joint 136 of vehicle 100 (e.g., during the installation of a new rod 108 on vehicle 100, or during the servicing of an already-installed rod 108 of vehicle 100). In the exemplary embodiment, joint 136 includes a first component (e.g., a bolt 142) and a second component (e.g., at least one nut 144 such as, for example, a jam nut) threaded onto bolt 142. Bolt 142 extends between first end 124 of second rod segment 116 and second end 120 of first rod segment 114, and nuts 144 are positioned between first end 124 and second end 120 along bolt 142. By rotating bolt 142, the length 139 of rod 108 is selectively adjustable (i.e., ends 120 and/or 124 are displaceable towards one another by rotating bolt 142 in a first direction (not shown), and ends 120 and/or 124 are displaceable away from one another by rotating bolt 142 in a second direction (not shown) opposite the first direction). After length 139 of rod 108 has been adjusted as desired, nuts 144 can be tightened to lock rod 108 at the desired length 139.

In the exemplary embodiment, to facilitate gripping first rod segment 114 while rotating bolt 142, first rod segment 114 includes an outer surface 146 that is contoured such that at least one flat 148 is defined near second end 120. More specifically, in the exemplary embodiment, outer surface 146 includes a first flat 150, a second flat 152 opposite first flat 150, and a third flat 154 that extends between first flat 150 and second flat 152. First and second flats 150 and 152, respectively, are oriented substantially parallel to one another, and third flat 154 extends substantially perpendicular to first and second flats 150 and 152, respectively. Similarly, to facilitate gripping second rod segment 116 while rotating bolt 142, second rod segment 116 likewise includes an outer surface 156 that is contoured to define at least one flat 158 near first end 124. More specifically, in the exemplary embodiment, outer surface 156 includes a first flat 160 and a second flat (not shown) that is opposite first flat 160 such that first flat 160 and the second flat are substantially parallel to one another. In other embodiments, outer surfaces 146 and/or 156 may include any number of suitable contours that facilitate enabling apparatus 200 to function as described herein (e.g., outer surfaces 146 and/or 156 may include only one flat in some embodiments).

Notably, it can be difficult for a person to perform a joint-adjustment procedure on rod 108 by himself/herself.

More specifically, it can be difficult for a single person to simultaneously grip first rod segment 114 and second rod segment 116 (e.g., using a pair of wrenches) to maintain their relative alignment, while also rotating bolt 142 and tightening nuts 144. As such, to facilitate enabling one-person to adjust joint 136, apparatus 200 is designed such that a single person may grip and maintain the relative alignment of rod segments 114 and 116, while also rotating bolt 142 and tightening nuts 144, as set forth in more detail below.

In the exemplary embodiment, apparatus 200 is generally U-shaped and includes a body 202, a first leg 204, and a second leg 206 that are integrally formed together as a single-piece, unitary structure. More specifically, body 202 extends between legs 204 and 206 such that legs 204 and 206 extend outward from body 202 in a substantially parallel relationship to one another. Although body 202, first leg 204, and second leg 206 are integrally formed together as a single-piece, unitary structure in the exemplary embodiment, first leg 204 and/or second leg 206 may be formed separately from body 202 and coupled to body 202 in any suitable manner in other embodiments.

In the exemplary embodiment, first leg 204 is generally plate-shaped and has a first proximal end 208 and a first distal end 210. First distal end 210 has a first surface 212 that defines a first recess 214 sized to receive first rod segment 114 at least partially therein. Similarly, second leg 206 is generally plate-shaped and has a second proximal end 216 and a second distal end 218. Second distal end 218 has a second surface 220 that defines a second recess 222 sized to receive second rod segment 116 at least partially therein. First surface 212 is contoured to slidably engage first rod segment 114 such that rotational movement of first rod segment 114 relative to first leg 204 is inhibited, and such that axial movement of first rod segment 114 relative to first leg 204 is enabled. For example, first recess 214 may be formed with at least one flat section 224 for engaging at least one flat 148 of first rod segment 114 and to thus inhibit rotational movement of first rod segment 114 relative to first leg 204, while permitting axial movement of first rod segment 114 relative to first leg 204. Although first rod segment 114 is formed with a substantially polygonal (e.g., substantially square or substantially rectangular) shape at second end 120 in the exemplary embodiment, first rod segment 114 may be formed with any other suitable shape at second end 120 in other embodiments.

Similarly, second surface 220 is contoured to slidably engage second rod segment 116 such that rotational movement of second rod segment 116 relative to second leg 206 is inhibited, and such that axial movement of second rod segment 116 relative to second leg 206 is enabled. For example, second recess 222 may be formed with at least one flat section 225 for engaging at least one flat 158 of second rod segment 116 and to thus inhibit rotational movement of second rod segment 116 relative to second leg 206, while permitting axial movement of second rod segment 116 relative to second leg 206. Although second rod segment 116 is formed with a substantially cylindrical shape at first end 124 in the exemplary embodiment, second rod segment 116 may be formed with any other suitable shape at first end 124 in other embodiments.

In the exemplary embodiment, apparatus 200 also includes a clamp 226 that selectively inhibits axial movement of second rod segment 116 relative to second leg 206. For example, in the exemplary embodiment, apparatus 200 includes a handle 238 having a threaded tip 239 that is selectively inserted into a threaded hole 230 formed in second leg 206 such that tip 239 is selectively protractible into, and retractable out of, second recess 222 to serve as clamp 226. More specifically, when tip 239 is inserted into hole 230 and into second recess 222, tip 239 contacts second rod segment 116 (e.g., a flat 158) and inhibits axial movement of second rod segment 116 relative to second leg 206. Similarly, when tip 239 is removed from hole 230 and out of second recess 222, tip 239 does not contact second rod segment 116 and does not inhibit axial movement of second rod segment 116 relative to second leg 206. As used herein, the terms "axial movement" and "rotational movement" of rod segments 114 and 116 refer to movements of rod segments 114 and 116 occurring at their respective legs 204 and 206 of apparatus 200.

Optionally, clamp 226 may include a first threaded hole (e.g., hole 230) formed on a first side 232 of second leg 206, and a second threaded hole 231 formed on a second side 234 of second leg 206, thereby enabling a clamping operation to be performed from either side 232 or 234 of second leg 206 by selectively inserting tip 239 into either respective hole 230 or 231. Although clamp 226 includes a component (e.g., handle 238) that is selectively detachable from second leg 206 in the exemplary embodiment, clamp 226 may not include a component that is selectively detachable from second leg 206 in other embodiments (i.e., the entire clamp 226 may not be detachable from second leg 206). Moreover, although handle 238 serves a dual functionality in the exemplary embodiment (i.e., handle 238 serves as the user's primary structure for gripping apparatus 200, and also serves as an actuator for clamp 226), apparatus 200 may include separate handle and clamp-actuation structures in other embodiments (i.e., handle 238 may not serve the dual purpose of actuating clamp 226 in other embodiments). Alternatively, clamp 226 may include any suitable components coupled together in any suitable manner and serving any suitable purpose(s) that facilitates enabling clamp 226 to function as described herein. Although first leg 204 does not include a clamping feature that inhibits movement of first rod segment 114 relative to first leg 204 in the exemplary embodiment, first leg 204 may include a clamp similar to clamp 226 in other embodiments.

In the exemplary embodiment, body 202 extends across joint 136 from first leg 204 to second leg 206 when first and second legs 204 and 206, respectively, are coupled to rod segments 114 and 116. Moreover, legs 204 and 206 are each sized such that body 202 is spaced apart from joint 136 when apparatus 200 is coupled to rod 108 (e.g., legs 204 and 206 may be sized such that body 202 is spaced apart from joint 136 by a distance 241 that enables a user of apparatus 200 to insert a tool between joint 136 and body 202). Although, in the exemplary embodiment, body 202 is generally I-shaped and includes a pair of concave sides 236 that facilitate enhanced tool access to joint 136, body 202 may have any other suitable shape that facilitates enabling apparatus 200 to function as described herein.

To use apparatus 200 for adjusting a joint 136 of rod 108, a user initially rotates second rod segment 116 about axis 130 at second coupling 134 until a predefined angular orientation is obtained wherein second coupling 134 is properly positioned relative to the respective wheel assembly 104. The user then inserts first rod segment 114 into first recess 214 of first leg 204, to cause flat section(s) 224 of first leg 204 to engage flat(s) 148 of first rod segment 114 such that rotation of first rod segment 114 relative to first leg 204 is inhibited. The user also inserts second rod segment 116 into second recess 222 of second leg 206 such that flat section(s) 225 of second leg 206 engages flat(s) 158 of second rod segment 116 to inhibit rotational movement of second rod segment 116 relative to second leg 206. The user then actuates clamp 226 by threading tip 239 of handle 238 into hole 230 such that tip 239 engages a flat 158 of second rod segment 116, thereby inhibiting axial movement of second rod segment 116 relative to second leg 206.

While continuing to grasp handle 238 in one hand to stabilize apparatus 200, the user then rotates bolt 142 via a tool (e.g., a wrench) held in the other hand to increase or decrease length 139 of rod 108 until wheel assemblies 104 are aligned, rod 108 is at a predefined length 139, a predefined spacing is obtained between ends 120 and 124, and/or any other desired orientation is achieved. As bolt 142 is rotated, first rod segment 114 slides through first recess 214 to enable the length adjustment of rod 108. Next, the user tightens nuts 144 using the tool, such that nuts 144 lock rod 108 at a length 139. Notably, while adjusting length 139 and locking rod 108 thereat, rod segments 114 and 116 are maintained in coaxial alignment at ends 120 and 124 via apparatus 200, and second rod segment 116 is maintained in the predefined angular orientation. The user may then unthread handle tip 239 from hole 230 to remove tip 239 from contacting second rod segment 116, and to withdraw rod segments 114 and 116 from their respective recesses 214 and 222 as apparatus 200 is disengaged from rod 108. Because apparatus 200 is substantially symmetrical across body 202 in some embodiments (e.g., because clamp 226 may include threaded holes 230 and 231 on each respective side 232 and 234 of second leg 206), apparatus 200 may be used for adjusting other rod(s) 108 on either side of vehicle 100 (e.g., a rod 108 on the driver side, or the passenger side, of vehicle 100).

The apparatus and method described herein facilitate adjusting a joint of a connecting rod (e.g., a tie rod or a toe link of an automobile suspension system). The apparatus is a handheld device that enables a single user to selectively adjust a rod joint without requiring the assistance of a second person. More specifically, the apparatus enables a single person to simultaneously engage a plurality of rod segments to maintain a desired alignment of the rod segments relative to one another, while also selectively adjusting a joint between the rod segments to increase/decrease the spacing between the rod segments for selectively lengthening/shortening the rod as desired. Additionally, the apparatus facilitates locking the rod segments at a desired spacing relative to one another, while maintaining an angular orientation of at least one of the rod segments relative to the other. Moreover, because the apparatus is substantially symmetrical from side-to-side, a user may be positioned on either side of the apparatus when using the apparatus (e.g., the same apparatus can be used to adjust a driver side tie rod and a passenger side tie rod). As such, the apparatus and method facilitate reducing the time, manpower, and effort necessary to adjust a connecting rod joint, particularly when adjusting a rod joint of an automobile suspension system during an alignment procedure.

Exemplary embodiments of an apparatus and a method for adjusting a joint of a connecting rod are described above in detail. The apparatus and method are not limited to the specific embodiments described herein, but rather, components of the apparatus and/or steps of the methods may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for adjusting a joint of a connecting rod, wherein the joint couples a first segment of the rod to a second segment of the rod, said apparatus comprising:
    a body;
    a first leg extending from said body, said first leg comprising a first distal end opposite the body, wherein said first distal end defines a first recess extending from said first distal end towards said body, said first recess sized to receive at least a portion of the first rod segment therein and shaped to inhibit rotational movement of the first rod segment while permitting axial movement of the first rod segment relative to said first leg;
    a second leg extending from said body, said second leg comprising a second distal end opposite said body, wherein said second distal end defines a second recess extending from said second distal end towards said body, said second recess sized to receive at least a portion of the second rod segment therein and shaped for inhibiting rotational movement of the second rod segment relative to said second leg; and
    a clamp selectively moveable into and out of the second recess to selectively inhibit axial movement of the second rod segment relative to said second leg.

2. The apparatus of claim 1 wherein said first leg comprises a first surface defining said first recess, said first surface comprising at least one flat section for inhibiting rotational movement of the first rod segment relative to said first leg.

3. The apparatus of claim 2 wherein said first surface comprises a pair of flat sections that oppose one another across said first recess.

4. The apparatus of claim 1 wherein said clamp comprises:
    a handle having a threaded tip; and
    at least one threaded hole defined in said second leg such that said handle is selectively coupled to said second leg via said at least one threaded hole, said at least one threaded hole extending through said second leg substantially perpendicular to said second recess, said threaded tip selectively protractible into said second recess through said at least one threaded hole to engage the second rod segment.

5. The apparatus of claim 4 wherein said second leg comprises a first side and a second side, said at least one threaded hole of said clamp comprising a first threaded hole defined in said first side and a second threaded hole defined in said second side.

6. A method for adjusting a joint of a connecting rod, wherein the joint couples a first segment of the rod to a second segment of the rod, said method comprises:
    grasping a handle of an apparatus including a body, a first leg extending from the body, and a second leg extending from the body, wherein the first leg has a first distal end opposite the body and the second leg has a second distal end opposite the body and a clamp, wherein the first distal end defines a first recess extending from the first distal end towards the body, wherein the second distal end defines a second recess extending from the second distal end towards the body, and wherein the clamp is selectively moveable into and out of the second recess to selectively inhibit axial movement of the second rod segment relative to said second leg;

engaging the first rod segment with the first distal end of the first leg by inserting at least a portion of the first rod segment within the first recess such that the first leg inhibits rotational movement of the first rod segment while permitting axial movement of the first rod segment relative to the first leg;

engaging the second rod segment with the second distal end of the second leg by inserting at least a portion of the second rod segment within the second recess such that the second leg inhibits rotational movement of the second rod segment relative to the second leg; and actuating the clamp such that axial movement of the second rod segment relative to the second leg is inhibited.

7. The method of claim 6 further comprising rotating a component of the joint to axially move the first rod segment relative to the first leg for changing a length of the rod.

8. The method of claim 7 further comprising rotating a bolt of the joint to move the first rod segment axially relative to the first leg.

9. The method of claim 8 further comprising tightening a nut on the bolt to lock the rod at the changed length.

10. The method of claim 6 further comprising engaging the first rod segment with at least one flat section of a first surface defining the first recess to inhibit rotational movement of the first rod segment relative to the first leg.

11. The method of claim 10 further comprising engaging the first rod segment with a pair of flat sections of the first surface that oppose one another across the first recess.

12. The method of claim 6 further comprising actuating the clamp by threading a tip of the handle into a hole of the second leg such that the tip protracts into the second recess and into contact with the second rod segment.

13. A method of assembling an apparatus for adjusting a joint of a connecting rod, wherein the joint couples a first segment of the rod to a second segment of the rod, said method comprises:

forming a body;

forming a first leg that extends from the body, the first leg including a first distal end opposite the body, wherein the first distal end defines a first recess extending from the first distal end towards the body, the first recess sized to receive at least a portion of the first rod segment therein and shaped to inhibit rotational movement of the first rod segment while permitting axial movement of the first rod segment relative to the first leg;

forming a second leg that extends from the body, the second leg including a second distal end opposite the body, wherein the second distal end defines a second recess extending from the second distal end towards the body, the second recess sized to receive at least a portion of the second rod segment therein and shaped to inhibit rotational movement of the second rod segment relative to the second leg; and fabricating a clamp of the apparatus such that the clamp is selectively moveable into and out of the second recess to selectively inhibit axial movement of the second rod segment relative to the second leg.

14. The method of claim 13 further comprising forming the first leg and the second leg integrally with the body as a single-piece, unitary structure.

15. The method of claim 13 wherein fabricating a clamp comprises fabricating a handle that is selectively coupled to the second leg such that the handle engages the second rod segment to inhibit axial movement of the second rod segment relative to the second leg.

16. The method of claim 15 wherein fabricating a handle comprises fabricating a handle that is selectively coupled to opposing sides of the second leg for engaging the second rod segment.

* * * * *